March 1, 1938.  H. E. MORSE  2,110,091
METHOD OF AND MEANS FOR MOLDING WASHERS IN HEELS
Filed March 13, 1936
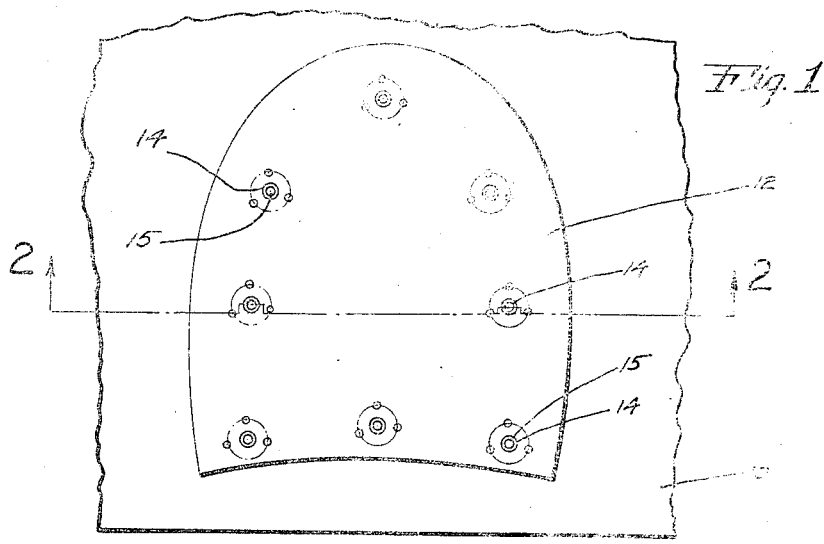
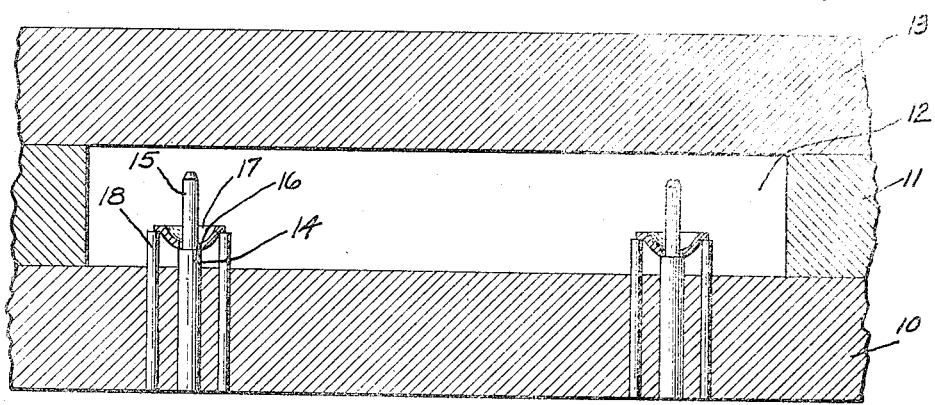
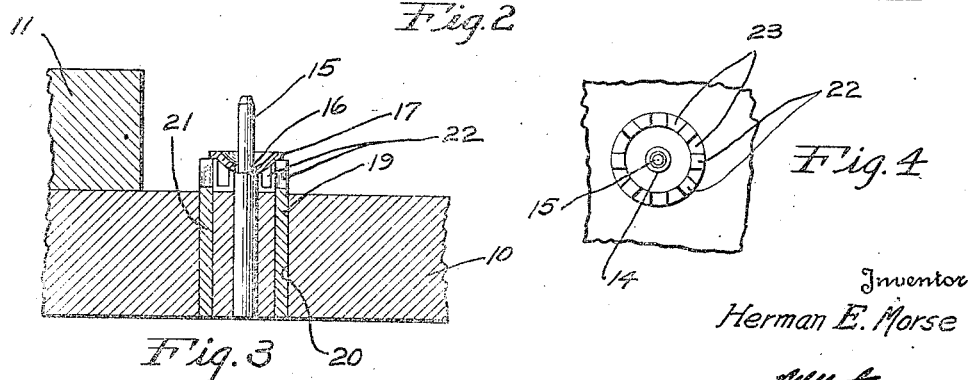
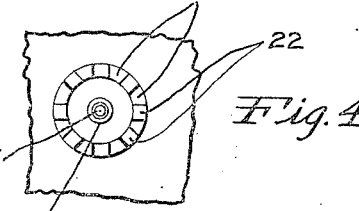
Inventor
Herman E. Morse
By
Attorney Patented Mar. 1, 1938

2,110,091

UNITED STATES PATENT OFFICE 2,110,091

METHOD OF AND MEANS FOR MOLDING WASHERS IN HEELS

Herman E. Morse, Akron, Ohio, assignor to Wingfoot Corporation, Wilmington, Del., a corporation of Delaware Application March 13, 1936, Serial No. 68,697

9 Claims. (Cl. 18—42)

The present invention relates to a means and method for inserting washers in rubber heels and is particularly directed to the proper locating of the washers in the finished heel, whereby the washers will be located properly to receive the nails that pass therethrough.

While the invention relates particularly to that type of heel which has "blind" washers therein, nevertheless, the same method can be applied to other types of heels. These "blind" washers are so termed because they are entirely covered by rubber on the tread side. The washers, however, have a definite spaced relation with respect to each other and to the outer periphery of the heel, whereby these heels can be applied to a shoe by suitable nailing machines which have nails spaced in the same manner as the openings in the washers whereby when the nails are driven through the tread portion of the heel they pierce the rubber and enter the openings in the washers. It is obvious that if the washers are canted or not centered properly, the nails may jam and bend when being applied or the nail may fail to enter the opening in the washer. Even if the nail enters the opening in the washer it may not properly secure the heel on the shoe unless the washers are all located so that their edges are in a plane substantially normal to the direction the nail is to be driven through same.

It is, therefore, an object of this invention to properly arrange the washers so that the edges thereof are all in the same plane or in the desired plane and to insure that the washers will not be tilted to an improper position within the heel.

Another object of this invention is to provide a method for centering the washers in the mold whereby when the rubber flows about the washers the washers will be maintained in their proper positions and will not be induced by the flow of rubber to become tilted.

Another object of this invention is to provide a centering means which supports the peripheral edge of the washer as distinguished from the central portion thereof.

Another object is to provide a method for centering washers by supporting them at their peripheral edges in addition to supporting same at the center.

Other objects will appear hereinafter as the description thereof proceeds, the novel features, arrangements and combinations being clearly set forth in the specification and the claims thereunto appended.

In the drawing:

Fig. 1 is a plan view of that part of the mold which supports the washers;

Fig. 2 is a cross section through a portion of the mold substantially on the line 2—2 of Fig. 1 but with the upper and intermediate portions of the mold in place;

Fig. 3 is a fragmentary cross section similar to that shown in Fig. 2, showing a modified means for supporting the washers; and Fig. 4 is a plan view of the washer-supporting means illustrated in Fig. 3.

In Fig. 2, 10 represents the lower portion of the mold which supports the means which carry and center the washers, 11 is the intermediate portion of the mold which has openings, such as 12, therein of the same peripheral shape as the heel which is to be produced, and 13 is the upper part of the mold used to define this side of the opening 12. This part of the mold may have some suitable design work on it which will appear on the bottom or tread portion of the heel when the heel is completed.

In the lower part 10 of the mold are arranged a series of pins 14 having a tight fit within suitable openings in the mold and these pins have reduced extensions 15. At the junction of the lower and reduced portions of the pins 14 there is formed a shoulder 16 on which the cup-shaped washer 17 rests when threaded on the reduced extension 15. This is common practice in the art but, due to the fact that the opening in the washer 17 through which the extension 15 extends, is generally of substantially greater diameter than the outer diameter of the reduced extension 15, there is a possibility of the washer tilting on the reduced extension when the rubber used to form the heel is placed under pressure and begins to flow about the washer. This tilting of the washer may be sufficient so that the horizontal diameter of the opening in one direction is reduced sufficiently to prevent the entrance of a nail therethrough when the heel is being applied, thereby either bending over the nail or preventing the entrance thereof entirely.

In order to assure the proper centering of the washers and to prevent their being tilted during the molding of the heel, I provide a plurality of peripherally arranged pins, such as 18, and preferably three or four in number, about each pin 14. The upper ends of these pins are all on the same level and higher than the shoulder 16, when a cup-shaped washer is used. The ends of these pins are at such a height as to support the edges of the cup-shaped washer as clearly illustrated in Fig. 2, whereby when the pressure on the rubber is exerted from above the rubber will not tilt the washer but will flow around the same and entirely embrace the washer, except for the portion thereof which is contacted by the pins 18 and the shoulder 16. By this means the peripheral edges of all the washers are maintained in the desired planes and the washers are properly positioned within the mold and in the finished rubber heel.

In Figs. 3 and 4 I have illustrated a modification of my invention in which the pins 18 are replaced by a cylindrical bushing 19 press-fitted within the opening 20 in the part 10 of the mold and, in turn, this bushing has a sleeve 21 press-fitted therein and carrying the pin 14 having a reduced portion 15 and shoulder 16, the same as in Fig. 2. The bushing 19 at the upper end thereof projects upwardly into engagement with the peripheral edge of the washer and in order to permit the rubber to flow beneath the washer, as well as over the same, I provide a series of slots 22 peripherally thereof, forming in effect a series of projections 23 which produce the same effect as the pins 18 in Fig. 2. In other words, the series of projections 22 support the washer peripherally and the openings therebetween permit the rubber to flow in under the washer 17, so that the rubber will embrace the washer except at the points of contact which the washer has with the pin 14 and the projections 22.

It is obvious that various changes may be made in the particular arrangement and construction of the parts shown in the drawing without departing from the scope of this invention and, therefore, I do not wish to limit myself in this invention except as may be hereinafter set forth in the claims hereunto appended.

Having thus fully described my invention, what I desire to claim and secure by Letters Patent of the United States is:

1. A mold comprising a plurality of sections defining a mold recess of the shape of the desired heel or the like, a plurality of pins arranged on one part of said mold and projecting into the recess defined by the mold parts, said pins having the ends thereof in the desired plane to support the edges of a washer adapted to be embraced within the material forming the heel.

2. Molding apparatus for heels and the like comprising a plurality of mold parts defining a heel-forming recess or the like, a plurality of pins arranged on one part of said mold for supporting the individual washers which are adapted to be embraced in the rubber of the heel after the molding operation, said pins being adapted to pass through a central opening of the respective washers supported thereon, and a plurality of circumferentially arranged pins spaced about each of said first pins and having portions thereof adapted to contact and support a portion of the respective washers spaced outwardly from said opening.

3. Heel molding apparatus comprising a mold having a plurality of parts defining a recess for the heel to be produced and a plurality of pins projecting into said mold recess, groups of said pins adapted to contact individual washers peripherally thereof to hold said washers against tilting during the molding process.

4. A mold comprising a plurality of sections defining a mold recess of the shape of the desired heel or the like, a plurality of spaced projections arranged on one part of said mold and projecting into the recess defined by the mold parts, said spaced projections having the ends thereof in the desired plane to support the edges of a washer adapted to be embraced within the material forming the heel.

5. The method of supporting washers having substantially flat peripheral marginal portions in heel-forming molds and the like to maintain the said washers in proper alignment while the heel is being molded, which comprises supporting each individual washer in spaced relation to the opposed inner faces of the mold at peripherally spaced points by means separate from the washers, to prevent tilting of the washers while permitting flow of the rubber over and under the washers.

6. A method as set forth in claim 5 which includes the additional step of supporting the washers centrally.

7. A mold for heels and the like adapted to support washers and the like having a substantially flat rim portion and central offset portion, comprising a plurality of mold sections with at least one mold section provided with one or more groups of projections adapted to engage said substantially flat rim portion, said projections being so arranged as to substantially engage said central offset portion and prevent lateral shifting of said washer.

8. A method as set forth in claim 5 which includes the additional step of supporting the washers against lateral shifting movement.

9. Heel molding apparatus and the like comprising a plurality of parts defining a mold recess, a plurality of sleeves supported by one of said parts and having spaced projecting portions on said sleeves extending into the mold recess defined by said parts for engaging the peripheral edges of a washer to support same, different groups of said projections supporting different individual washers to prevent the same from tilting out of their proper plane.

HERMAN E. MORSE.